US011515997B2

(12) United States Patent
Duchin

(10) Patent No.: US 11,515,997 B2
(45) Date of Patent: Nov. 29, 2022

(54) PRIVACY ENHANCED PROXIMITY TRACKER

(71) Applicant: Duality Technologies, Inc., Maplewood, NJ (US)

(72) Inventor: Zohar Duchin, Hertzeliya (IL)

(73) Assignee: Duality Technologies, Inc., Maplewood, NJ (US)

( * ) Notice: Subject to any disclaimer, the term of this patent is extended or adjusted under 35 U.S.C. 154(b) by 1 day.

(21) Appl. No.: 17/337,935

(22) Filed: Jun. 3, 2021

(65) Prior Publication Data
US 2021/0399873 A1 Dec. 23, 2021

Related U.S. Application Data

(60) Provisional application No. 63/041,386, filed on Jun. 19, 2020.

(51) Int. Cl.
*H04L 29/06* (2006.01)
*H04L 9/00* (2022.01)
*H04L 9/40* (2022.01)

(52) U.S. Cl.
CPC .............. *H04L 9/008* (2013.01); *H04L 9/006* (2013.01); *H04L 63/0421* (2013.01)

(58) Field of Classification Search
None
See application file for complete search history.

(56) References Cited

U.S. PATENT DOCUMENTS

| 9,825,758 B2* | 11/2017 | Feng ................. H04L 9/008 |
| 2015/0046708 A1* | 2/2015 | Yasuda ............... H04L 9/14 |
| | | 713/168 |
| 2015/0244517 A1* | 8/2015 | Nita .................. H04L 63/0428 |
| | | 713/168 |

(Continued)

OTHER PUBLICATIONS

El Emam, Khaled, et al. "A secure protocol for protecting the identity of providers when disclosing data for disease surveillance." *Journal of the American Medical Informatics Association* 18.3 (2011): 212-217.

(Continued)

*Primary Examiner* — Maung T Lwin
(74) *Attorney, Agent, or Firm* — Pearl Cohen Zedek Latzer Baratz LLP

(57) ABSTRACT

A device, system and method for privacy enhanced proximity detection by secure collaboration between a first party without access to user locations and a second party without access to a target user identifier. The second party may receive from the first party a homomorphic encryption public key and homomorphic encrypted target user identifier or masked target location, and may determine an associated homomorphic encrypted target user location. The second party may search a homomorphically encrypt database of user locations and associated user identifiers for homomorphic encrypted proximate user identifiers associated with homomorphic encrypted user locations proximate to the homomorphic encrypted target user location. The second party may send the first user the search result of homomorphic encrypted proximate user identifiers to be decrypted by the first party with a private key to identify proximate user identifiers without knowing their locations.

20 Claims, 4 Drawing Sheets

(56) References Cited

U.S. PATENT DOCUMENTS

| | | | | |
|---|---|---|---|---|
| 2016/0182222 | A1* | 6/2016 | Rane | H04L 63/0428 |
| | | | | 713/168 |
| 2017/0099133 | A1* | 4/2017 | Gu | H04W 4/023 |
| 2018/0248684 | A1* | 8/2018 | Oliver | H04L 63/0281 |
| 2020/0327252 | A1* | 10/2020 | Mcfall | G06F 21/78 |
| 2021/0167950 | A1* | 6/2021 | Arkko | H04L 9/008 |
| 2021/0194668 | A1* | 6/2021 | Masters | G06F 21/602 |
| 2022/0224508 | A1* | 7/2022 | Sirdey | H04L 9/008 |

OTHER PUBLICATIONS

Altuwaiyan, Thamer, Mohammad Hadian, and Xiaohui Liang. "EPIC: efficient privacy-preserving contact tracing for infection defection." *2018 IEEE International Conference on Communications (ICC)*. IEEE, 2018.

Shi, Hui, et al. "A homomorphic encrypted reversible information hiding scheme for integrity authentication and piracy tracing." *Multimedia Tools and Applications* 77.16 (2018): 20535-20567.

Krämer, Alexander, Mirjam Kretzschmar, and Klaus Krickeberg, eds. *Modern infectious disease epidemiology: Concepts, methods, mathematical models, and public health*. Springer Science & Business Media, 2010.

\* cited by examiner

PRIVACY ENHANCED PROXIMITY TRACKER

CROSS-REFERENCE TO RELATED APPLICATIONS

This application claims the benefit of U.S. Provisional Patent Application Ser. No. 62/041,386, filed on Jun. 19, 2020, which is hereby incorporated by reference in its entirety.

FIELD OF THE INVENTION

Embodiments of the invention are directed to data privacy, security, and homomorphic encryption of secret data.

BACKGROUND OF THE INVENTION

Tracking proximity has wide application in fields such as contact tracing (e.g., to mitigate the spread of viruses), navigation and route planning, automated driving, etc. Proximity detection, however, relies on acquiring users' personal location information. Users' personal location information is typically considered private, as it by nature cannot be sufficiently anonymized. While certain users may elect to waive their privacy, proximity tracking exposes their private location information to the tracker and potentially other malicious parties. Further, some users may elect not to share their private location information, leaving blind spots in location data omitted for these unenrolled users, resulting in poor proximity tracking accuracy. Conventional applications thus cannot accurately track proximity without widely exposing private user location data.

Accordingly, there is a long felt need in the art to provide proximity tracking that both securely protects private user location data and tracks enough users for reliable accuracy.

SUMMARY OF EMBODIMENTS OF THE INVENTION

Embodiments of the invention overcome the aforementioned problems inherent in the art by performing double-blind collaborative proximity tracking in which unencrypted target user identity information and user location information are divided among multiple parties so that no single party possesses both sets of unencrypted information to expose a target user's location. Secure collaboration determines proximity using homomorphically encrypted data to compute proximity without exposing the underlying unencrypted data. In this way, a proximity tracker determines proximate users without knowing their locations or revealing the target's identities.

According to some embodiments of the invention, a device system and method is provided for privacy enhanced proximity detection by secure collaboration between a first party without access to user locations and a second party without access to a target user identifier. The second party may receive from the first party a homomorphic encryption public key, a homomorphic encryption evaluation key, and a homomorphic encrypted target user identifier or homomorphic encrypted masked target location encrypted by the first party using the public key. The second party may homomorphically encrypt a database of user locations and associated user identifiers using the public key. The second party may determine a homomorphic encrypted target user location associated with the received homomorphic encrypted target user identifier or the homomorphic encrypted masked target location. The second party may homomorphically compute, using the evaluation key, a proximity search identifying one or more candidate users in the homomorphically encrypted database with homomorphic encrypted user locations proximate to the homomorphic encrypted target user location of the target user. The second party may send the first party one or more homomorphic encrypted proximate user identifiers for the one or more respective candidate users identified as proximate to the target user in the proximity search. The first party may generate a private key corresponding to the public key, receive from the second party the one or more homomorphic encrypted proximate user identifiers for the one or more respective candidate users identified as proximate to the target user in the proximity search, and decrypt, using the private key, the one or more homomorphic encrypted proximate user identifiers to detect unencrypted identities of the one or more respective users identified as proximate to the target user in the proximity search, without accessing the target user, candidate users, or proximate users' locations.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
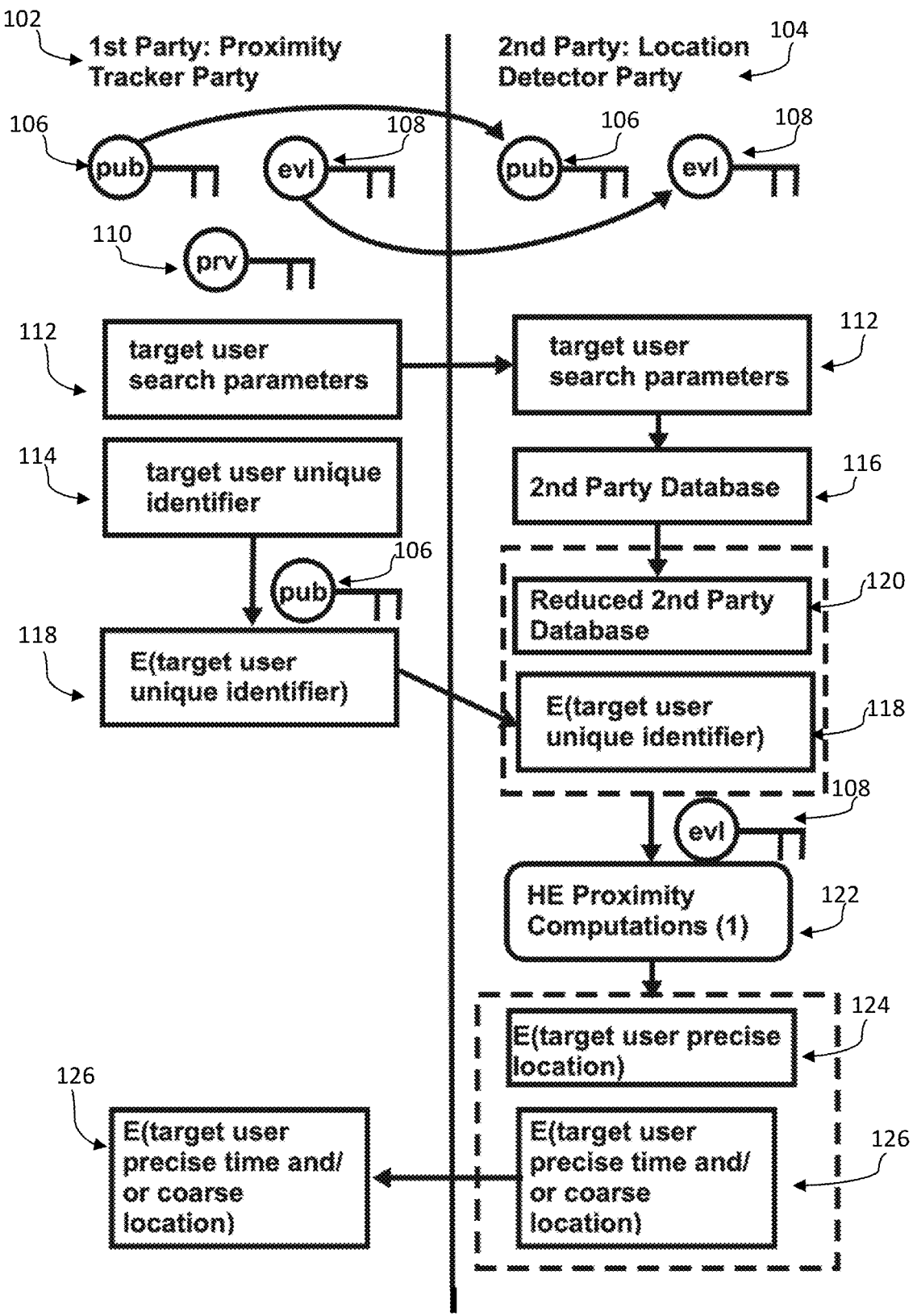
FIGS. 1A and 1B are schematic illustrations of data structures for collaborative privacy enhanced proximity detection, according to various embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

To overcome the aforementioned problems inherent in the art, embodiments of the invention may provide double-blind collaborative proximity tracking where private user information is divided among multiple parties so that no single party possesses enough information to link a target user's identity to its location information, thereby avoiding exposing the target's private data. In some embodiments, a first party may possess an unencrypted target user identity and a different second party may possess unencrypted user location data. Each party may independently encrypt its respective data set, which may be exchanged with the other party in encrypted form, so that each party's respective private data is not revealed to the other party. Because no single party is able to link the target user's identity and its location information, the user's privacy is preserved.

Secure collaboration may be performed using Homomorphic Encryption (HE), which allows computations to be performed over encrypted data sets, in a homomorphically encrypted space, without revealing the underlying data. Homomorphic Encryption (HE) cryptosystems allow multiple independent parties, each with their own respective secret encrypted data, to combine data and evaluate computations on the combined encrypted data without learning anything about it, such that only the legitimate recipient of the homomorphic calculation will be able to decrypt it using the recipient's secret HE key.

Secure collaboration over homomorphic encrypted data may track the proximity of one or more user relative to a target individual and/or target location. For example, in contact tracing applications, proximity tracking may identify individuals that have come into contact with that target individual within a predetermined proximity threshold or criterion and within a predetermined time period. In one embodiment, the first party (possessing unencrypted target user identities) may encrypt a target user identity using a public HE key to send to the second party who does not possess the secret key and so, cannot reveal the unencrypted target identity. The second party (possessing unencrypted location data) may homomorphically encrypt its database of location and associated user identity data using the same public HE key. In some embodiments, the homomorphically encrypted database may be reordered, e.g., randomly, semi-randomly or deterministically under a homomorphically encrypted ordering, to reduce the ability to trace identity by database order. The second party may then perform a proximity search in HE space by (a) searching its database of encrypted user identities for the encrypted target user identity and (b) comparing associated encrypted locations between the encrypted target user identity and other candidate encrypted user identities (e.g., by HE distance computations) to find proximate users. All computations are performed in HE space so no unencrypted search results are revealed to the second party that does not possess the secret HE key. The second party may return the proximity search results—the encrypted identifiers of proximate user(s)—to the first user who can decrypt the search results to reveal the proximate user identities, but not their locations. In general, no one party has access at any time to both the unencrypted target identity data (e.g., stored at the first party, but not the second party) and unencrypted location data (e.g., stored at the second party, but not the first party). While the second party links location data to corresponding user identifiers, the second party does not know which identifier belongs to the target user and so, its identity as the target is protected. Thus, the collaboration may be considered double blind and secure by not revealing the location(s) of a target user, thereby improving privacy compared to conventional proximity trackers. Further, because user location privacy is sufficiently protected, all or an above threshold proportion of users may participate with limited or no risk to privacy, to establish a unanimous or above threshold enrollment to improve proximity tracking accuracy.

Additionally or alternatively to searching for users proximate to a target user, some embodiments may search for users proximate to a target location. Because the first party cannot know location data, in addition to encryption (which the first party can decrypt using its secret key), the target location data may comprise another layer of secrecy, e.g., masking using random numbers, a second encryption for which the second party (but not the first party) has the secret key, a secret hashing, etc. The first party may retrieve encrypted and masked (or double encrypted) location data from the second party (e.g., searched based on parameters, such as, locations occupied by a target user, locations occupied according to certain patterns, above threshold population density locations, etc.). Because the location data is masked (or double encrypted), even with its secret decryption key, the first party cannot reveal the true location data. The first party then selects a target homomorphically encrypted masked (or double encrypted) location and sends it back to the second party. The second party may search for, and return to the first party, all encrypted users proximate to the target location. The first party may then use its secret private key to decrypt the identities and reveal those users proximate to the target, without learning any user's locations.

For various levels of security, embodiments of the invention may use a symmetric or asymmetric data sharing scheme. In a symmetric sharing scheme, both the target user identity data and user location data are treated with the same level of security. As long as both data are encrypted, either or both may be shared for collaborative proximity tracking, e.g., with each other or with a third party tracker. In an asymmetric sharing scheme, the user location data may be treated with a higher level of security than the target user identity data, and only the encrypted target user identity data may be shared, but not the user location data (in either encrypted or unencrypted form). Because the user location data is not shared or exchanged with any party at any time, collaborative proximity tracking computations using the location data are performed at the source second party that detects that location data. Because computations on the location data are performed locally at the location data source, and the precise location data is never exchanged, the precise location data is not vulnerable to interception or exposed to other parties, thereby further improving privacy of the particularly sensitive location information.

Homomorphic Encryption (HE) computations in the encrypted space typically require more calculations and are slower and less efficient compared to equivalent computations on plaintext data in the unencrypted space. HE is particularly inefficiency in proximity tracking applications due to the large amount of location data typically associated with tracking user proximity. To mitigate the volume of location data tracked, instead of searching a target user's proximity to all other users, embodiments of the invention may perform a narrowed search limiting proximity tracking to search only proximities within a "coarse" region, thereby reducing the search space and accelerating the proximity tracking algorithm in homomorphically encrypted space. The coarse region data may identify a user's location to within a sufficiently large space as to preserve the anonymity of the associated user's identity. For example, the coarse region may be sufficiently large to contain multiple users, so that no one user within the region may be positively identified. The coarse region may be defined by, e.g., an above threshold sized area, an area with an above threshold number of people within that region, an area with an above threshold population density, etc. The coarse region may be dynamically size (e.g., fluctuating in real-time based on real-time population density) or a fixed size (e.g., set based on averages or historical estimates). Because the coarse region preserves anonymity, it may not be considered private data and may be exchanged in plaintext form without revealing the party's true precise location. In other embodiments, the coarse region may be exchanged in encrypted form. When proximity tracking targets the coarse region, significantly fewer homomorphic computations may be performed compared to tracking proximity over the full search space, thereby increasing computational speed with substantially the same accuracy of proximity detection.

An example proximity tracking algorithm that tracks users in proximity to a target user by secure collaboration between a first party possessing an unencrypted target user identity (e.g., a contact tracer, navigation engine, etc.) and a second party possessing unencrypted user location data (e.g., a location detector such as a GPS device, mobile carrier, etc.) may proceed as follows:

1. The first party generates the following encryption keys under the homomorphic encryption schema: private key, public key and evaluation keys. In some embodiments, an evaluation key is not used.
2. The first party encrypts the target reference entity's unique identifier using the public key. The target identifier may be encoded prior to encryption to reduce the length of the data and its resulting encrypted form to accelerate HE computations on the data.
3. The first party sends the encrypted reference entity's unique identifier to the second party. In some embodiments, to limit the search space, the first party may also send data indicating a relevant evaluation time period (e.g., a time span, such as, the last 14 days). In some embodiments, time data may not be considered private, in which case, it can be sent as plain text. Alternatively, if the time data is considered private, it may be sent in encrypted form and searched in HE space. The first party may request proximity events (e.g., two parties within a threshold distance from each other or occupying the same area) and/or a specific measure of proximity (e.g., a scalar distance between parties). In some embodiments, a map may be segmented into a plurality of areas (e.g., a grid of equally sized regions, regions of different sizes but with the same number of people, etc.). A proximity event may be detected when two users or user devices are co-located in the same map area or within a threshold distance from each other.
4. The first party also sends to the second party the public key and evaluation key.
5. The second party uses the public key to encrypt its location and associated user data and evaluation keys to perform computations on the encrypted data to retrieve an encrypted result of all locations occupied by the target identity and associated precise times, during the relevant search time period. The encrypted precise times may be sent back to the first party. In some embodiments, the encrypted precise locations may not be sent as they are sensitive and private information.
6. In order to improve performance, the second party may send coarse regions per time (e.g., locations that preserve anonymity). This will reduce the amount of data on which the encrypted computation are performed.
7. The first party decrypts the times and, if applicable, the coarse regions.
8. The first party may send the coarse regions and times as plain text (or encrypted data) to the second party. The second party may filter its search space according to these coarse regions and times to reduce the data set analyzed and accelerate algorithmic performance. In order to preserve privacy, the number of users in the coarse region at the specified time should be higher than a specified threshold (e.g., send 6 digit coordinates for the threshold of the coarse region), or the size of the coarse location (uncertainty in location) should be above a threshold.
9. On the second party's data and the homomorphically encrypted precise locations (which the second party already possesses), the second party performs homomorphic computations to search for and retrieve the unique identifiers for all additional candidate entities that were within a threshold radius or region of the target's precise location in the relevant time period and/or their associated distance measures of proximity. Those unique identifiers are sent back to the first party in an encrypted form.
10. The first party decrypts the retrieved unique identifiers with its private key to detect those corresponding entities that were in proximity to the target reference entity and/or their proximity measures. Such detection may trigger an action, such as, altering a navigation path, transmitting an alert to one or more devices of the detected entities and/or first party, etc.

Additional or alternative operations may be performed; operations may be performed in the same or different order(s), and various operations may be performed in sequence or in parallel.

Embodiments of the invention protect the privacy of the target user entities (e.g., Covid-19 carriers in a contact tracing application) by preventing the second party (location detector) from accessing private information (e.g., a target user being a Covid-19 carrier) and possibly establish a database using this information. Conversely, embodiments of the invention also protect the privacy of these target user entity by hiding the precise locations the users have occupied from the first party (e.g., healthcare authority).

Performing the above proximity tracking computations at a second party that is the source of the location data (e.g., a GPS device, mobile carrier, etc.) prevents sharing of location data for improved security. However, these proximity tracking computations may additionally or alternatively be performed fully or partially at the first party (e.g., with an extra layer of masking or encrypting the location data), a third party or at any combination of the first party, second party and/or third party.

In some embodiments, the second party may send precise location data of the reference entity back to the first party after masking it with random numbers or double-encrypting it with an additional public key (the corresponding secret key known only to the second party). In this embodiment, the first party gets back the times and the masked (or double-encrypted) precise locations where the reference entity has been. The first party then sends the times and the homomorphically encrypted masked (or double-encrypted) target precise location information to the second party. Using this homomorphically encrypted masked (or double-encrypted) target precise location information, the second party computes all identifiers that were in the same precise locations (e.g., within an exposure radius or region) and times without revealing the identifier locations. In this embodiment, the privacy of all entities is preserved.

Figure 1B:
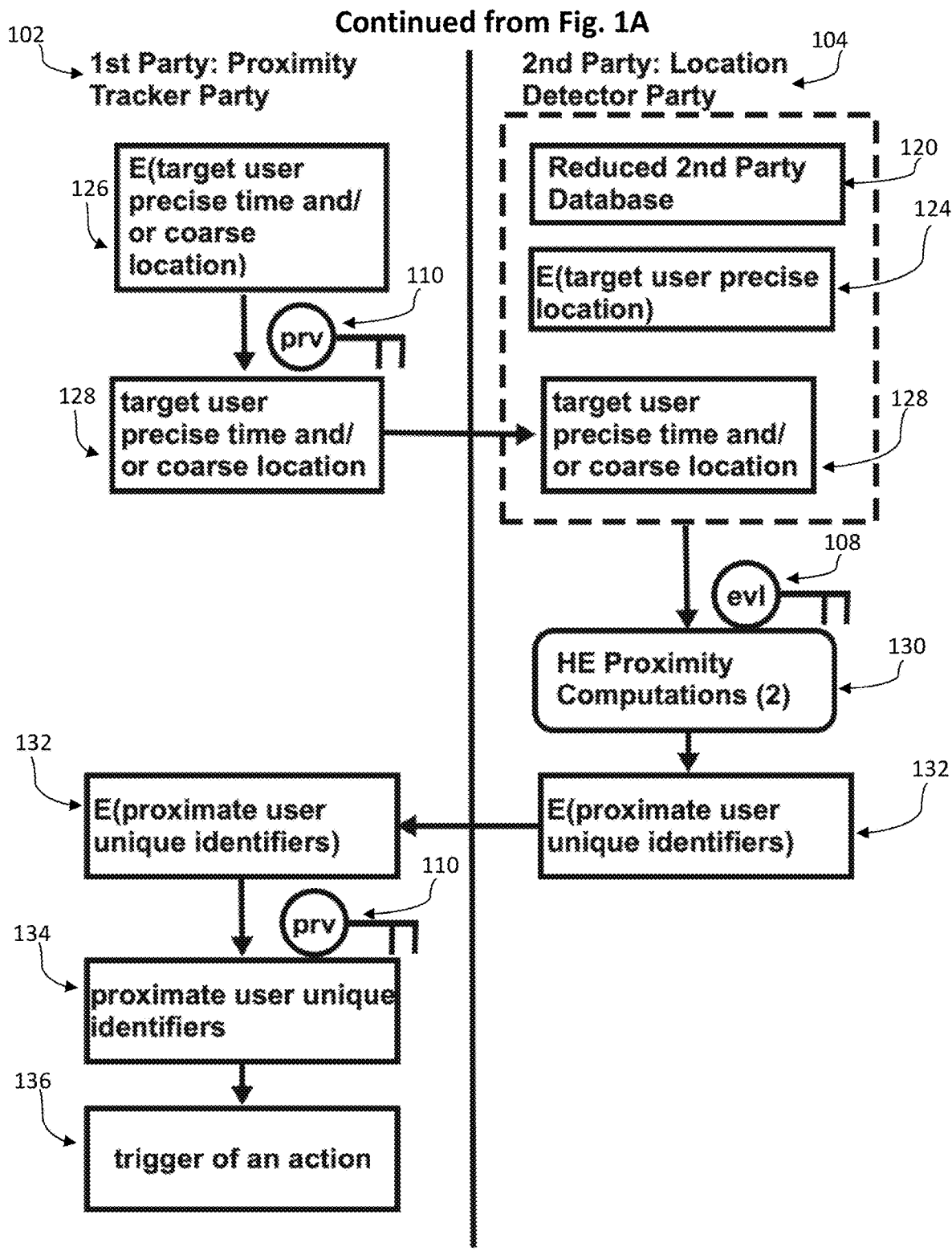

Reference is made to FIGS. 1A and 1B, which schematically illustrate data structures for collaborative privacy enhanced proximity detection between a first party 102 and a second party 104, according to some embodiments of the invention. First party 102 may be a proximity tracker that may track proximity to a target user without access to the target user's location information. First party 102 possesses a unique identifier for the target user 114 (e.g., phone number, biometric signature, etc.) and target user search parameters 112 which may comprise a predetermined relevant time period (e.g., last two weeks) and/or a predetermined proximity threshold or criteria (e.g., occupying a same area of a segmented map) that may constitute a candidate user being proximate to the target user. Additionally or alternatively, target user search parameters 112 may include a masked target location or a coarse search location. Second party 104 may be a location detector that possesses a second party database 116 comprising users' unique identifiers and corresponding location and time information, but which does not know which unique identifier belongs to the target user, thereby preserving the target user's anonymity.

Beginning in FIG. 1A, first party 102 may generate a public key 106 which may be used for encrypting data, an evaluation key 108 which may be used to perform computations over encrypted data, and a secret key 110 associated with the public key 106 and which may be used for decrypting encrypted data and/or encrypted results of computations performed over encrypted data. All keys 106, 108, and 110 may be generated using a homomorphic encryption (HE) schema. First party 102 may then homomorphically encrypt the target user unique identifier 114 using the public key 106 to generate an encrypted target user unique identifier 118.

First party 102 may collaborate by sharing with second party 104 the public key 106, evaluation key 108, target user search parameters 112, and encrypted target user unique identifier 118. Second party 104 cannot access target user unique identifier 114 in unencrypted form as it does not possess private key 110 thus preserving anonymity of the target user. Second party 104 may homomorphically encrypt second party database 116 with public key 106. In some scenarios, e.g., where target user search parameters 112 are of a sensitive nature, first party 102 may homomorphically encrypt target user search parameters 112 using public key 106 and share encrypted target user search parameters with second party 104.

Second party 104 may then use target user search parameters 112 to filter second party database 116 to generate a reduced second party database 120 that may be limited to a subset of database 116 data satisfying target user search parameters 112 (e.g., relevant time period, coarse location space). Second party 104 may use evaluation key 108 to perform homomorphic computations 122 to search reduced second party database 120 for encrypted target user unique identifier 118 and its associated encrypted target user precise location 124 and corresponding encrypted target user precise time and/or coarse location 126. Encrypted target user precise location 124 may comprise locations occupied by the target user during the time period and/or within a coarse location specified by target user search parameters 112. Target user precise location 124 may not be exposed in unencrypted form to second party 104 as it does not possess private key 110, nor to first party 102 as encrypted target user precise location 124 may not be exchanged between parties. As both first party 102 and second party 104 cannot access target user precise location 124, the target user's privacy is preserved.

Continuing in FIG. 1B, first party 102 may decrypt target user precise time and/or coarse location 126 using secret key 110 to generate unencrypted target user precise time and/or coarse location 128. Precise time and coarse location data are sufficiently anonymous not to reveal the target user's precise location. First party 102 may share unencrypted target user precise time and/or coarse location 128 with second party 104. Second party 104 may perform homomorphic computations 130 using evaluation key 108 to search reduced second party database 120 within unencrypted target user precise time and/or coarse location 128 for encrypted proximate user unique identifiers 132 associated with homomorphic encrypted user locations proximate to encrypted target user precise location 124. Encrypted proximate user unique identifiers 132 may comprise unique identifiers of candidate users that may meet proximity threshold criteria set forth by target user search parameters 112 (e.g., being within a threshold distance of, or the same region as, the target user's precise location within a threshold time period).

Searching reduced second party database 120 for only data satisfying unencrypted target user precise time and/or coarse location 128 may reduce the amount of data over which homomorphic computations 130 are performed. Given the smaller size of database 120 being searched, second party 104 may thus more efficiently compute encrypted proximate user unique identifiers 132, thereby accelerating proximity tracking. Further, because target user's coarse location may identify a sufficiently large space, the anonymity of the target user's identity within that space is preserved, and thus, may be safely shared between parties.

Second party 104 may share encrypted proximate user unique identifiers 132 with first party 102. First party 102 may then decrypt encrypted proximate user unique identifiers 132 using private key 110 to generate unencrypted proximate user unique identifiers 134 without ever knowing the target user's or any proximate candidate users' location. First party 102 (or second or a third party) may then trigger an action 136 such as altering a navigation path, transmitting an alert to candidate users identified as proximate to the target user, etc.

Figure 2:
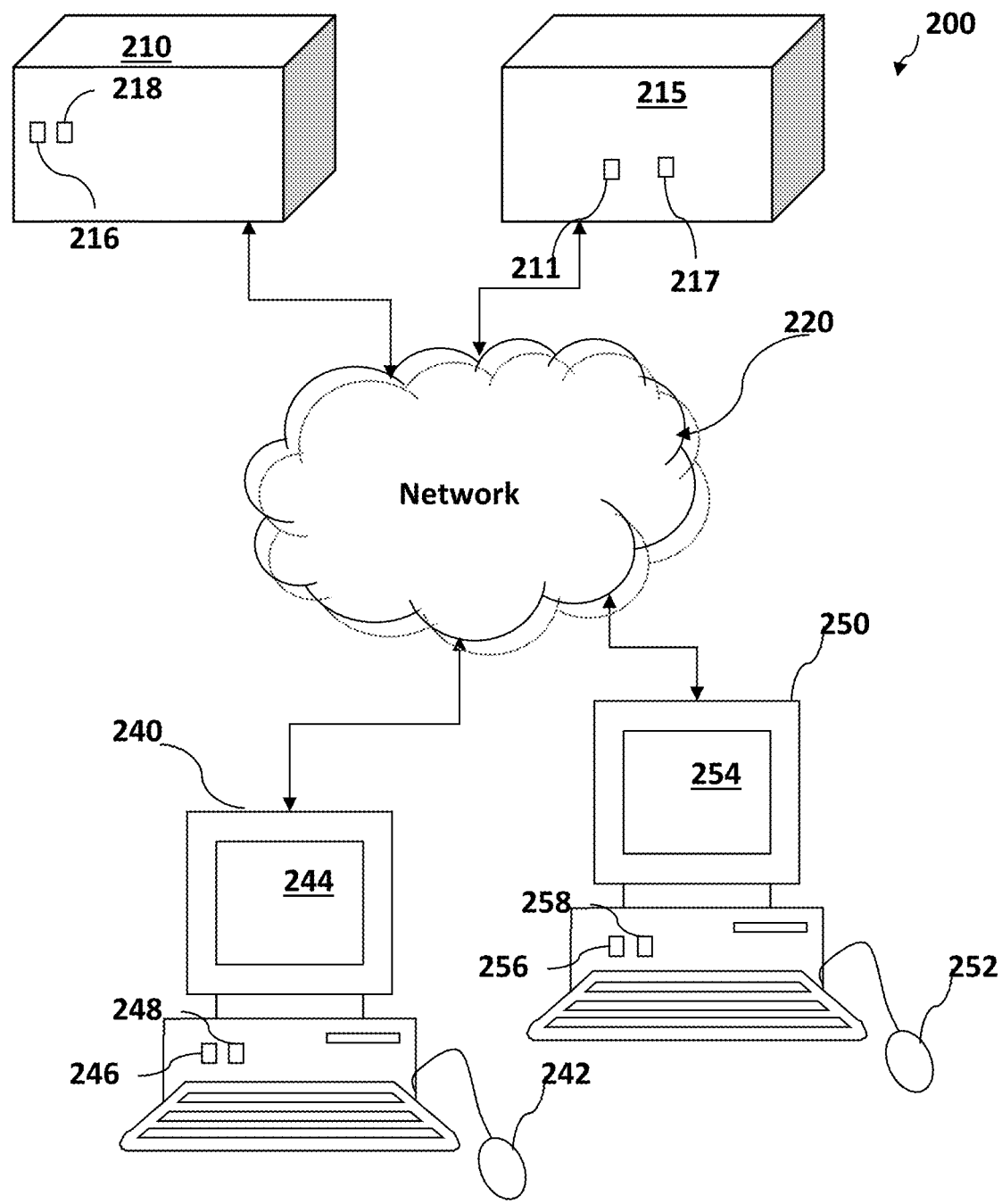
FIG. 2 is a schematic illustration of a system for privacy enhanced proximity tracking, according to some embodiments of the invention.

Reference is made to FIG. 2, which schematically illustrates a system 200 for privacy enhanced proximity detection, according to some embodiments of the invention. The embodiments described herein may be executed using any single or combination of devices and/or components of system 200 of FIG. 2. The devices of system 200 may be operated by parties of FIGS. 1A and 1B, or other parties. For example, first party 102 of FIGS. 1A and 1B may be a proximity tracker operating device(s) 210, second party 104 of FIGS. 1A and 1B may be a location detector operating device(s) 215, the target user may operate device(s) 240, and a plurality of candidate users may operate a respective plurality of device(s) 250.

Each party's device(s) 210, 215, 240, and 250, may include one or more server(s), storage device(s), database(s), computer(s) such as, personal computers, desktop computers, mobile computers or devices, laptop computers, and notebook computers or any other suitable device such as a smart device, cellular telephone, personal digital assistant (PDA), Internet of Things (IoT) device, video game console, etc., and may include wired or wireless connections or modems. In one embodiment, proximity tracker device(s) 210 include one or more servers, location detector device(s) 215 include one or more memory unit(s) 217 comprising database(s), and entity devices 240 and 250 may include one or more mobile computers or devices, such as, smart cellular telephones. Entity devices 240 and 250 may each include a location detector (e.g., GNSS or GPS device) configured to record the device's location information, and respective memories 248 and 258 for storing the location information. Entity devices 240 and 250 may include one or more input devices 242 and 252, respectively, for receiving input from a user, such as, verification of location or number of proximate individuals. Entity devices 240 and 250 may include one or more output devices 244 and 254 (e.g., a monitor or screen) for displaying data to a user provided by or for proximity tracker device(s) 210, such as, a proximity alert. Entity devices 240 and 250 may transmit their respective location information over network 220 to location detector device(s) 215, but not to proximity tracker device(s) 210 that does not have access to the user location information.

Proximity tracker device(s) 210 may generate a public key for homomorphic encryption, an evaluation key for computations in homomorphic encrypted space, and a private key for homomorphic decryption (e.g., 106, 108, and 110, respectively, of FIG. 1A). Proximity tracker device(s) 210 may store a target user identifier (e.g., 114 of FIG. 1A) uniquely identifying target user device(s) 240, and may homomorphically encrypt the target user identifier, using the public key, to generate an encrypted target user identifier (e.g., 118 of FIG. 1A). Additionally or alternatively, proximity tracker device(s) 210 may receive and store a homomorphically encrypted masked target location. Proximity tracker device(s) 210 may send to location detector device(s) 215 the homomorphically encrypted target user identifier, public key, evaluation key, and/or the homomorphic encrypted masked target location.

Location detector device(s) 215 may receive and store the homomorphic encrypted target user identifier, public key, evaluation key, and/or the homomorphic encrypted masked target location sent by the proximity tracker device(s) 210. Location detector device(s) 215 may store a database (e.g., 116 of FIG. 1A) of user locations in memory unit(s) 217 and associated user identifiers of user device(s) 240 and 250. Location detector device(s) 215 may use the public key to homomorphically encrypt the user location database (or a reduced database limited to a subset of location data satisfying target user search parameters, such as, relevant time period, coarse location space, etc.). Location detector device(s) 215 may determine the homomorphic encrypted target user location (e.g., 124 of FIG. 1A) associated with the received homomorphic encrypted target user identifier and/or the homomorphic encrypted masked target location. Location detector device(s) 215 may homomorphically compute (e.g., using homomorphic computations 130 of FIG. 1B) using the evaluation key, a proximity search identifying one or more candidate user device(s) 250 with homomorphic encrypted user locations proximate to the homomorphic encrypted target user location of the target user device(s) 240. Location detector device(s) 215 may send to proximity tracker device(s) 210 one or more homomorphic encrypted proximate user identifiers (e.g., 132 of FIG. 1B) for the one or more respective candidate user device(s) 250 identified as proximate to the target user device(s) 240 in the proximity search.

Proximity tracker device(s) 210 may receive from the location detector device(s) 215 the one or more homomorphic encrypted proximate user identifiers (e.g., 132 of FIG. 1B) for the one or more respective candidate user device(s) 250 identified as proximate to the target user device(s) 240 in the proximity search. Proximity tracker device(s) 210 may decrypt, using the secret key associated with the public key, the one or more received homomorphic encrypted proximate user identifiers to detect unencrypted identities of the one or more respective users (e.g., 134 of FIG. 1B) identified as proximate to the target user in the proximity search, without accessing the target user's or proximate users' location data.

Location detector device(s) 215 may automatically obtain location information from the target and candidate reference entities, via location detectors or sensors on their respective devices 240 and 250 owned by or operated by the target reference entity, such as a mobile device (e.g., cellular telephone, wirelessly connected computing device connected to WiFi, etc.) or other computing device (e.g., cellular towers or access points identifying location via device triangulation). Location detector device(s) 215 may obtain and maintain the location information on such computing devices (e.g., mobile device, computing device), and may operate computing devices such as servers, which may communicate with user computing devices via one or more networks, such as, cellular telephone networks, the Internet, etc. Location detector device(s) 215 may automatically collect the user location information from entity devices 240 and 250, and may store the location information locally on memory unit(s) 217 and/or remotely in memory unit(s) 248 and 258 of their respective entity devices 240 and 250. Additionally or alternatively, location detector device(s) 215 may comprise devices 240 and 250 and location information may be stored in memory unit(s) 248 and 258.

Any or all of system 200 devices may be connected via one or more network(s) 220. Network 220 may be any public or private network such as the Internet. Access to network 220 may be through wire line, terrestrial wireless, satellite or other systems known in the art.

Each system device 210, 215, 240, and 250 may include one or more controller(s) or processor(s) 216, 211, 246, and 256, respectively, for executing operations according to embodiments of the invention and one or more memory unit(s) 218, 217, 248, and 258, respectively, for storing data (e.g., entity location and time data, unique identifiers, secret key, public key and/or evaluation keys) and/or instructions (e.g., software for applying computations or for homomorphically encrypting data, for masking data, and other operations according to embodiments of the invention) executable by the processor(s) according to embodiments of the invention. Processor(s) 216, 211, 246, and/or 256 may include, for example, a central processing unit (CPU), a digital signal processor (DSP), a microprocessor, a controller, a chip, a microchip, an integrated circuit (IC), or any other suitable multi-purpose or specific processor or controller. Memory unit(s) 218, 217, 248, and/or 258 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units.

According to some embodiments of the invention, other devices or combinations of devices may be used in system 200. Components from multiple different devices may be combined into a single device or components from a single device may be separated into multiple different devices that may also be used in system 200.

Figure 3:
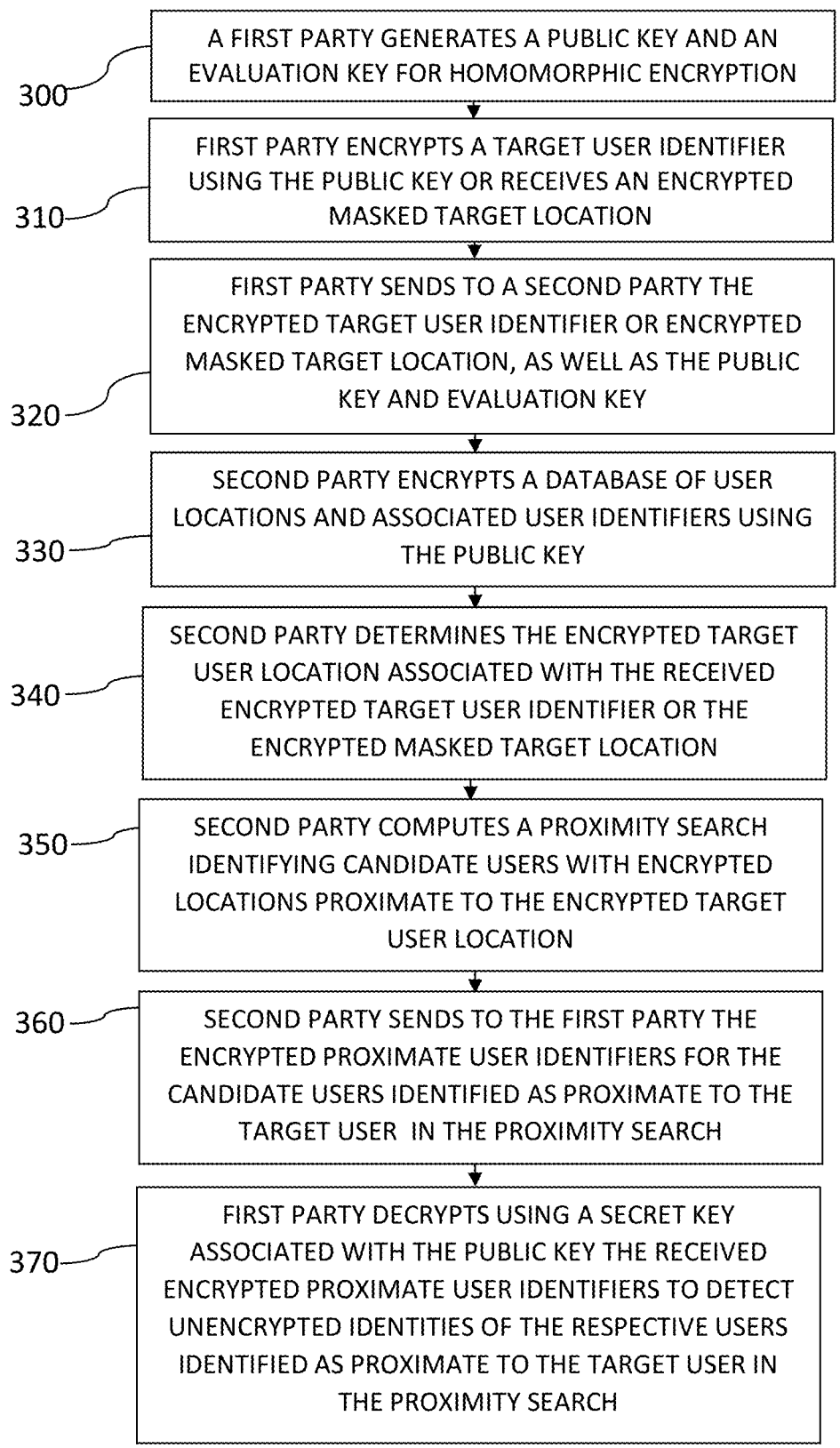
FIG. 3 is a flowchart of a method for privacy enhanced proximity tracking, according to some embodiments of the invention.

Reference is made to FIG. 3, which is a flowchart of a method for privacy enhanced proximity detection, according to some embodiments of the invention. The operation(s) of FIG. 3 may be performed using devices or components disclosed in reference to the system of FIG. 2 and/or using the data structures disclosed in reference to FIG. 1A and/or FIG. 1B. For example, the operation(s) of FIG. 3 may be performed using one or more processors 216 of proximity tracker device(s) 210 of FIG. 2 which may be operated by a first party (e.g., 102 of FIG. 1A) and/or one or more processors 211 of location detector device(s) 215 of FIG. 2 which may be operated by a second party (e.g., 104 of FIG. 1A). Other devices or systems may also be used.

In operation 300, one or more processors (e.g., 216 of FIG. 2) at the proximity tracker device (e.g., 210 of FIG. 2), without access to user location data, may generate a public key (e.g., 106 of FIG. 1A), a corresponding secret key (e.g., 110 of FIG. 1A), and optionally an evaluation key (e.g., 108 of FIG. 1A) for homomorphic encryption.

In operation 310, one or more processors (e.g., 216 of FIG. 2) at the proximity tracker device (e.g., 210 of FIG. 2) may homomorphically encrypt, using the public key, a target user identifier (e.g., 114 of FIG. 1A) uniquely identifying a target user device (e.g., 240 of FIG. 2). Additionally or alternatively, the one or more processors may receive a homomorphic encrypted masked target location from the second device, e.g., representing locations of the target user. In some embodiments, one or more processors (e.g., 211 of FIG. 2) at the location detector device (e.g., 215 of FIG. 2) may generate the homomorphic encrypted masked target location by homomorphically encrypting and masking user location data for one or more users. The one or more processors at the proximity tracker device may select the homomorphic encrypted masked target location from the homomorphic encrypted masked user location data.

In operation 320, one or more processors (e.g., 216 of FIG. 2) at the proximity tracker device (e.g., 210 of FIG. 2) may send to the location detector device (e.g., 215 of FIG. 2) and the one or more processors (e.g., 211 of FIG. 2) at the location detector device may receive the homomorphic encrypted target user identifier (e.g., 118 of FIG. 1A), the public key, and optionally the evaluation key. Additionally or alternatively, the one or more processors at the proximity tracker device may send to the location detector device and the one or more processors at the location detector device may receive the homomorphic encrypted masked target location.

In operation 330, one or more processors (e.g., 211 of FIG. 2) at the location detector device (e.g., 215 of FIG. 2), with access to user location data, may homomorphically encrypt a data base (e.g., 116 of FIG. 1A) of user locations and associated user identifiers using the public key. In some embodiments, the one or more processors may encode the user identifiers in the database to reduce their data length prior to homomorphically encrypting the database. In some embodiments, one or more memories (e.g., 217 of FIG. 2) at the location detector device (e.g., 215 of FIG. 2) may store the database of user locations at a secure server inaccessible to the first party. In some embodiments, the one or more memories may store the database of user locations in homomorphically encrypted form, and not in unencrypted form. In some embodiments, the one or more processors may homomorphically encrypt the database of unencrypted user locations using the public key received from the proximity tracker device (e.g., 210 of FIG. 2). In some embodiments, the one or more processors may initially homomorphically encrypt the database of user locations using a second public key different than the public key received from the proximity tracker device. Further, the one or more processors may perform proxy re-encryption to swap homomorphically encrypting the database of user locations by the second public key to the public key received from the proximity tracker device.

In operation 340, one or more processors (e.g., 211 of FIG. 2) at the location detector device (e.g., 215 of FIG. 2) may determine the homomorphic encrypted target user location (e.g., 124 of FIG. 1A) associated with the received homomorphic encrypted target user identifier (e.g., 118 of FIG. 1A). Additionally or alternatively, the one or more processors may determine the homomorphic encrypted target user location associated with the homomorphic encrypted masked target location.

In operation 350, one or more processors (e.g., 211 of FIG. 2) at the location detector device (e.g., 215 of FIG. 2) may homomorphically compute, e.g., using the evaluation key, a proximity search (e.g., 130 of FIG. 1B) identifying one or more candidate user devices (e.g., 250 of FIG. 2) with homomorphic encrypted user locations proximate to the homomorphic encrypted target user location of the target user device (e.g., 240 of FIG. 2). In some embodiments, the one or more processors (e.g., 216 of FIG. 2) of the proximity tracker device (e.g., 210 of FIG. 2) may receive a coarse region of interest that is sufficiently large to not be traceable to any one user therewithin. The one or more processors at the location detector device may receive the coarse region of interest. The one or more processors at the location detector device may perform the proximity search targeted to a subset of the user location data filtered to locations within the coarse region and excluding locations outside the coarse region.

In operation 360, one or more processors (e.g., 211 of FIG. 2) at the location detector device (e.g., 215 of FIG. 2) may send the proximity tracker device (e.g., 210 of FIG. 2) and the one or more processors (e.g., 216 of FIG. 2) at the proximity tracker device may receive from the location detector device one or more homomorphic encrypted proximate user identifiers (e.g., 132 of FIG. 1B) for the one or more respective candidate user devices (e.g., 250 of FIG. 2) identified as proximate to the target user device (e.g., 240 of FIG. 2) in the proximity search. In some embodiments, the one or more processors at the location detector device may not share location data with the first party in encrypted or unencrypted forms.

In operation 370, one or more processors (e.g., 216 of FIG. 2), at the proximity tracker device (e.g., 210 of FIG. 2) may decrypt, using a secret key (e.g., 110 of FIG. 1A) associated with the public key, the one or more received homomorphic encrypted proximate user identifiers (e.g., 132 of FIG. 1B) to detect unencrypted identities (e.g., 134 of FIG. 1B) of the one or more respective users identified as proximate to the target user in the proximity search, without accessing the target user or proximate users' location data.

Other or additional operations may be executed in the same or different order. For example, operation 330 of encrypting the database may precede selection of the target user and its identifier encryption in operation 310.

Embodiments of the invention may include an article such as a non-transitory computer or processor readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

In the above description, an embodiment is an example or implementation of the inventions. The various appearances of "one embodiment," "an embodiment" or "some embodiments" do not necessarily all refer to the same embodiments. Although various features of the invention may be described in the context of a single embodiment, the features of embodiments may also be provided separately or in any suitable combination. Conversely, although the invention may be described herein in the context of separate embodiments for clarity, the invention may also be implemented in a single embodiment. Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

The descriptions, examples, methods and materials presented in the claims and the specification are not to be construed as limiting but rather as illustrative only. While certain features of the present invention have been illustrated and described herein, many modifications, substitutions, changes, and equivalents may occur to those of ordinary skill in the art. It is, therefore, to be understood that the appended claims are intended to cover all such modifications and changes as fall with the true spirit of the invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Different embodiments are disclosed herein. Features of certain embodiments may be combined with features of other embodiments; thus certain embodiments may be combinations of features of multiple embodiments. Accordingly, the scope of the invention should not be limited by what has thus far been described, but by the appended claims and their legal equivalents.

The invention claimed is:

1. A method for privacy enhanced proximity detection, the method comprising:
    at a first party device:
       generate a public key and an evaluation key for homomorphic encryption;
       homomorphically encrypt a target user identifier using the public key or receive an homomorphically encrypted masked target location; at a second party device without access to a target user identifier:
       receiving, from the first party device without access to user locations, a homomorphic encryption public key and the homomorphic encrypted target user identifier or homomorphic encrypted masked target location encrypted by the first party device using the public key;
       homomorphically encrypting a database of user locations and associated user identifiers using the public key;
       determining a homomorphic encrypted target user location associated with the received homomorphic encrypted target user identifier or the homomorphic encrypted masked target location;
       homomorphically computing a proximity search identifying one or more candidate users in the homomorphically encrypted database with homomorphic encrypted user locations proximate to the homomorphic encrypted target user location of the target user;
       sending the first party device one or more homomorphic encrypted proximate user identifiers for the one or more respective candidate users identified as proximate to the target user in the proximity search; and at the first party device:
       decrypting using a secret key associated with the public key the received one or more homomorphic encrypted proximate user identifiers for the one or more respective candidate users identified to detect unencrypted identities of the respective user identified as proximate to the target user in the proximity search.

2. The method of claim 1 comprising, at the first party: generating a private key corresponding to the public key; receiving from the second party device the one or more homomorphic encrypted proximate user identifiers for the one or more respective candidate users identified as proximate to the target user in the proximity search; and decrypting, using the private key, the one or more homomorphic encrypted proximate user identifiers to detect unencrypted identities of the one or more respective users identified as proximate to the target user in the proximity search, without accessing the target user, candidate users, or proximate users' locations.

3. The method of claim 1, wherein the second party device does not share user locations with the first party device in encrypted or unencrypted forms.

4. The method of claim 1 comprising, at the second party device, receiving a coarse region of interest that is sufficiently large to not be traceable to any one user therewithin; and performing the proximity search targeted to a subset of the homomorphically encrypted database filtered to locations within the coarse region and excluding locations outside the coarse region.

5. The method of claim 1 comprising, at the second party device, encoding the user identifiers in the database to reduce their data length prior to homomorphically encrypting the database.

6. The method of claim 1 comprising, at the second party device, homomorphically encrypting and masking the user locations for one or more users; sending the homomorphic encrypted masked user locations to the first party; and receiving the homomorphic encrypted masked target location selected by the first party device from the homomorphic encrypted masked user locations.

7. The method of claim 1 comprising, at the second party device, storing the database of user locations at a secure server inaccessible to the first party.

8. The method of claim 1 comprising, at the second party device, storing the database of user locations in homomorphically encrypted form, and not in unencrypted form.

9. The method of claim 1, wherein the database of unencrypted user locations is homomorphically encrypted using the public key received from the first party.

10. The method of claim 1, wherein the database of user locations is initially homomorphically encrypted using a second public key different than the public key received from the first party device, the method further comprising, at the second party device, performing proxy re-encryption to swap homomorphically encrypting the database of user locations by the second public key to the public key received from the first party.

11. A system for privacy enhanced proximity detection, the system comprising:
    a first party device, comprising one or more processors including one or more memories storing instructions that when executed cause the one or more processors to:
       generate a public key and an evaluation key for homomorphic encryption;
       homomorphically encrypt a target user identifier using the public key or receive an homomorphically encrypted masked target location;
    a second party device, without access to a target user identifier, comprising:
       a homomorphically encrypted database of user locations and associated user identifiers that is homomorphic encrypted using a public key received from a first party device that does not have access to the user locations;
       one or more processors including one or more memories storing instructions that when executed cause the one or more processors to:

receive, from the first party, the homomorphic encrypted target user identifier or homomorphic encrypted masked target location encrypted by the first party device using the public key, determine a homomorphic encrypted target user location associated with the received homomorphic encrypted target user identifier or the homomorphic encrypted masked target location, homomorphically compute a proximity search identifying one or more candidate users in the homomorphically encrypted database with homomorphic encrypted user locations proximate to the homomorphic encrypted target user location of the target user, and send the first party device one or more homomorphic encrypted proximate user identifiers for the one or more respective candidate users identified as proximate to the target user in the proximity search; and the first party device also is caused to:

decrypt using a secret key associated with the public key the received one or more homomorphic encrypted proximate user identifiers for the one or more respective candidate users identified to detect unencrypted identities of the respective user identified as proximate to the target user in the proximity search.

12. The system of claim 11 comprising the first party device having one or more processors configured to:

generate a private key corresponding to the public key, receive from the second party device the one or more homomorphic encrypted proximate user identifiers for the one or more respective candidate users identified as proximate to the target user in the proximity search, and decrypt, using the private key, the one or more homomorphic encrypted proximate user identifiers to detect unencrypted identities of the one or more respective users identified as proximate to the target user in the proximity search, without accessing the target user, candidate users, or proximate users' locations.

13. The system of claim 11, wherein the second party device does not share user locations with the first party device in encrypted or unencrypted forms.

14. The system of claim 11, wherein the one or more processors at the second party device are configured to identify a coarse region of interest that is sufficiently large to not be traceable to any one user therewithin; and perform the proximity search targeted to a subset of the homomorphically encrypted database filtered to locations within the coarse region and excluding locations outside the coarse region.

15. The system of claim 11, wherein the one or more processors at the second party device are configured to encode the user identifiers in the database to reduce their data length prior to homomorphically encrypting the database.

16. The system of claim 11, wherein the one or more processors at the second party device are configured to:

homomorphically encrypt and mask the user locations for one or more users, send the homomorphic encrypted masked user locations to the first party, and receive the homomorphic encrypted masked target location selected by the first party device from the homomorphic encrypted masked user locations.

17. The system of claim 11, wherein the one or more processors at the second party device are configured to store the homomorphically encrypted database of user locations at a secure server inaccessible to the first party.

18. The system of claim 11, wherein the one or more processors at the second party device are configured to store the database of user locations in homomorphically encrypted form, and not in unencrypted form.

19. The system of claim 11, wherein the homomorphically encrypted database of user locations is initially encrypted using a second public key different than the public key received from the first party, and the one or more processors at the second party device are further configured to perform proxy re-encryption to swap homomorphically encrypting the database of user locations by the second public key to the public key received from the first party.

20. A non-transitory computer readable storage medium for privacy enhanced proximity detection, the computer readable storage medium having instructions stored thereon, which when executed by one or more processors, cause the processors to:

at a first party device:

generate a public key and an evaluation key for homomorphic encryption;

homomorphically encrypt a target user identifier using the public key or receive an homomorphically encrypted masked target location; at a second party device without access to a target user identifier:

receive, from a first party device without access to user locations, the homomorphic encryption public key and a homomorphic encrypted target user identifier or homomorphic encrypted masked target location encrypted by the first party device using the public key;

homomorphically encrypt a database of user locations and associated user identifiers using the public key;

determine a homomorphic encrypted target user location associated with the received homomorphic encrypted target user identifier or the homomorphic encrypted masked target location;

homomorphically compute a proximity search identifying one or more candidate users in the homomorphically encrypted database with homomorphic encrypted user locations proximate to the homomorphic encrypted target user location of the target user;

send the first party device one or more homomorphic encrypted proximate user identifiers for the one or more respective candidate users identified as proximate to the target user in the proximity search; and at the first party device:

decrypt using a secret key associated with the public key the received one or more homomorphic encrypted proximate user identifiers for the one or more respective candidate users identified to detect unencrypted identities of the respective user identified as proximate to the target user in the proximity search.

* * * * *